U S011243223B2

(12) United States Patent
Kitamura

(10) Patent No.: US 11,243,223 B2
(45) Date of Patent: Feb. 8, 2022

(54) AIRFLOW VELOCITY MEASURING APPARATUS AND AIRFLOW RATE MEASURING APPARATUS

(71) Applicant: Murata Manufacturing Co., Ltd., Nagaokakyo (JP)

(72) Inventor: Akihiro Kitamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 263 days.

(21) Appl. No.: 16/774,401

(22) Filed: Jan. 28, 2020

(65) Prior Publication Data

US 2020/0166535 A1 May 28, 2020

Related U.S. Application Data

(63) Continuation of application No. PCT/JP2018/028802, filed on Aug. 1, 2018.

(30) Foreign Application Priority Data

Aug. 5, 2017 (JP) .............................. JP2017-152066

(51) Int. Cl.
  *G01P 5/12* (2006.01)
  *G01F 1/69* (2006.01)
  (Continued)

(52) U.S. Cl.
  CPC ................. *G01P 5/12* (2013.01); *G01F 1/69* (2013.01); *G01F 15/043* (2013.01); *G01K 7/22* (2013.01); *G01K 7/16* (2013.01)

(58) Field of Classification Search
  CPC . G01P 5/12; G01F 1/69; G01F 15/043; G01K 7/22; G01K 7/16
  See application file for complete search history.

(56) References Cited

U.S. PATENT DOCUMENTS 6,023,969 A * 2/2000 Feller .................... G01F 1/6842
  374/132
6,035,726 A   3/2000 Bernard et al.
  (Continued)

FOREIGN PATENT DOCUMENTS

JP   H0682286 A   3/1994
JP   2003240620 A   8/2003
  (Continued)

OTHER PUBLICATIONS

International Search Report issued for PCT/JP2018/028802, dated Oct. 30, 2018.
  (Continued)

*Primary Examiner* — Ryan D Walsh
(74) *Attorney, Agent, or Firm* — Arent Fox LLP

(57) ABSTRACT

An airflow velocity measuring apparatus that includes a fixed-temperature heat generating device. The fixed-temperature heat generating device includes a power supply, a positive-temperature-coefficient thermistor element, a switching element, a comparator element, a first negative-temperature-coefficient thermistor element, a second negative-temperature-coefficient thermistor element, and plural resistor elements. The positive-temperature-coefficient thermistor element is disposed at a measuring point at which the velocity of airflow is measured. The switching element is repeatedly turned ON and OFF so as to cause the positive-temperature-coefficient thermistor element to generate heat at a preset temperature, thereby applying a pulse voltage from the power supply to the positive-temperature-coefficient thermistor element. The airflow velocity measuring apparatus measures the velocity of airflow at the measuring point based on the waveform of this pulse voltage. Adding of a second switch makes it possible to correct measurement errors caused by a rise or a fall in the temperature of subject airflow.

13 Claims, 9 Drawing Sheets

(51) Int. Cl.
   *G01F 15/04*   (2006.01)
   *G01K 7/22*    (2006.01)
   *G01K 7/16*    (2006.01)

(56) References Cited

U.S. PATENT DOCUMENTS

| | | |
|---|---|---|
| 6,786,088 B2 | 9/2004 | Matsumura |
| 2003/0154781 A1 | 8/2003 | Matsumura |
| 2006/0100795 A1 | 5/2006 | Hagan et al. |
| 2013/0125643 A1 | 5/2013 | Batty et al. |

FOREIGN PATENT DOCUMENTS

| | | | | |
|---|---|---|---|---|
| JP | 200814729 A | 1/2008 | | |
| JP | 2008241318 A | 10/2008 | | |
| JP | 201252808 A | 3/2012 | | |
| WO | WO-2018047385 A1 * | 3/2018 | ............. | G01F 1/699 |
| WO | WO-2018047836 A1 * | 3/2018 | ................ | G01P 5/12 |
| WO | WO-2018105753 A2 * | 6/2018 | ................ | G01P 5/12 |

OTHER PUBLICATIONS

Written Opinion of the International Searching Authority issued for PCT/JP2018/028802, dated Oct. 30, 2018.

\* cited by examiner

FIG. 6 – PRIOR ART
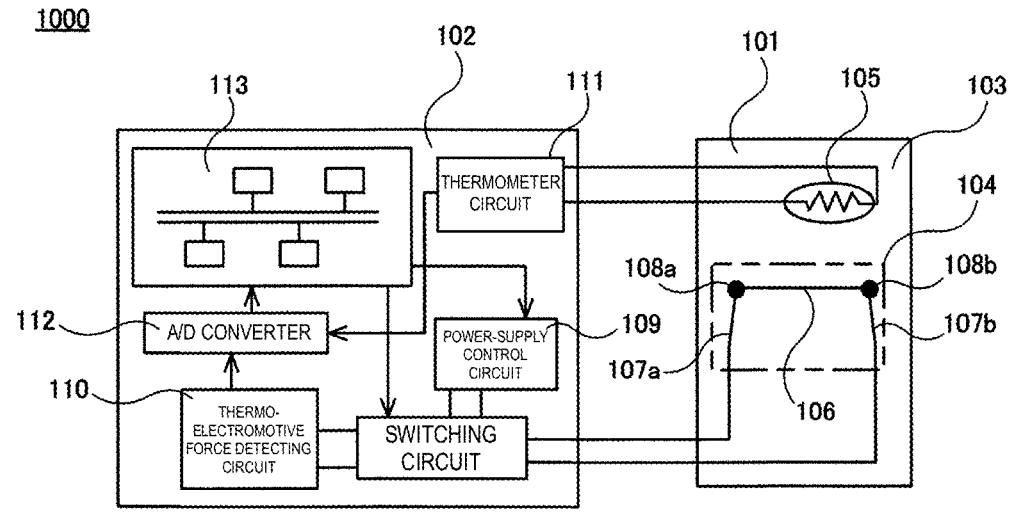
FIG. 7
AIRFLOW VELOCITY MEASURING APPARATUS
USED AS REFERENCE: 1100A
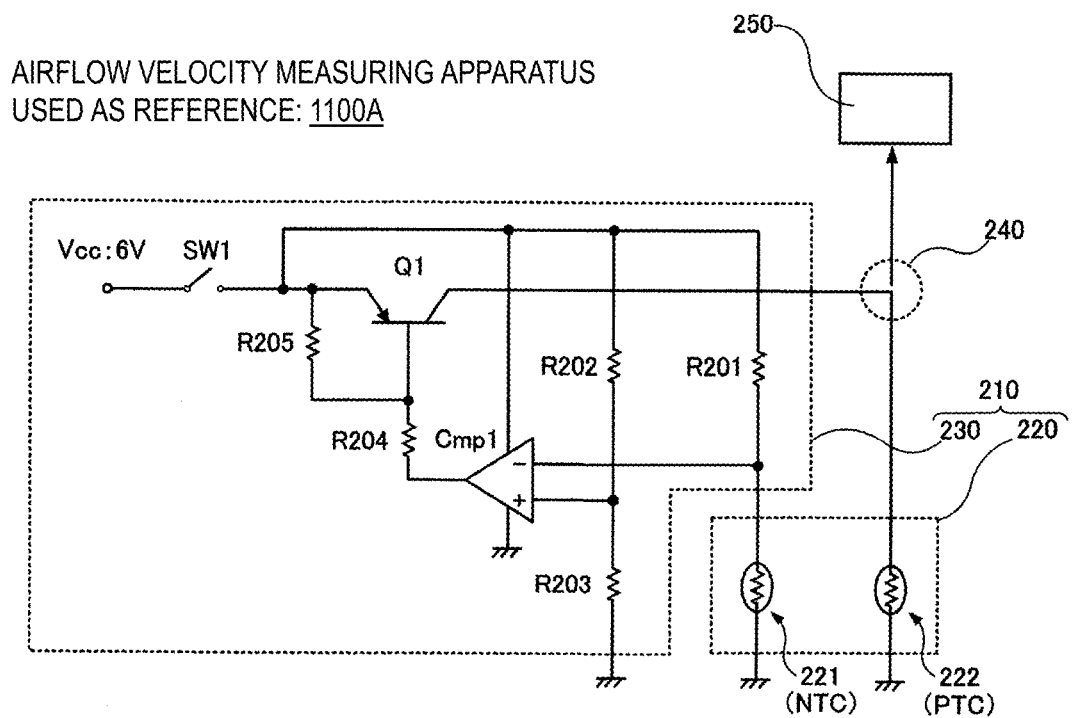

AIRFLOW VELOCITY MEASURING APPARATUS AND AIRFLOW RATE MEASURING APPARATUS

CROSS REFERENCE TO RELATED APPLICATIONS

The present application is a continuation of International application No. PCT/JP2018/028802, filed Aug. 1, 2018, which claims priority to Japanese Patent Application No. 2017-152066, filed Aug. 5, 2017, the entire contents of each of which are incorporated herein by reference.

FIELD OF THE INVENTION

The present invention relates to an airflow velocity measuring apparatus, and more particularly, to an airflow velocity measuring apparatus that has a simple structure and is easy to manufacture at low cost and achieves high accuracy of measurement. The airflow velocity measuring apparatus of the present invention has a function of correcting measurement errors that occur in the airflow velocity caused by a rise or a fall in the temperature of subject airflow.

The present invention also relates to an airflow rate measuring apparatus that uses the above-described airflow velocity measuring apparatus.

BACKGROUND OF THE INVENTION

An airflow velocity measuring apparatus that is disposed within a duct, for example, to measure the velocity of a gas passing through the apparatus is disclosed in Patent Document 1 (Japanese Unexamined Patent Application Publication No. 2008-241318). A gas flowmeter 1000 disclosed in Patent Document 1 is shown in FIG. 6. The gas flowmeter 1000 is a device for measuring "airflow rate (gas flow rate)" instead of "airflow velocity." As suggested in Patent Document 1, however, converting between "airflow rate" and "airflow velocity" is very easy.

The gas flowmeter 1000 includes a sensor body 101 and a controller 102.

The sensor body 101 includes a thermocouple 104 and a thermistor element (thermistor) 105 formed on a printed substrate 103.

The thermocouple 104 includes heating wire 106 and copper foils 107a and 107b bonded to the respective ends of the heating wire 106. The heating wire 106 is formed of constantan, which is one type of Cu—Ni alloy, generating a thermo-electromotive force between the heating wire 106 and copper. In the thermocouple 104, as a result of supplying power to the heating wire 106, a thermo-electromotive force is generated between nodes 108a and 108b, which are disposed between the heating wire 106 and the respective copper foils 107a and 107b.

The controller 102 includes a power-supply control circuit 109, a thermo-electromotive force detecting circuit 110, a thermometer circuit 111, an A/D converter 112, and a control circuit 113. The power-supply control circuit 109 controls power supply to the heating wire 106. The thermo-electromotive force detecting circuit 110 detects a thermo-electromotive force generated between the nodes 108a and 108b. The thermometer circuit 111 receives output from the thermistor element 105. The A/D converter 112 converts an analog signal supplied from the thermo-electromotive force detecting circuit 110 or the thermometer circuit 111 into a digital signal. The control circuit 113 controls the above-described elements.

In the case of a gentle gas flow, the gas flowmeter 1000 causes the thermo-electromotive force detecting circuit 110 to detect a thermo-electromotive force corresponding to a temperature difference ΔT between the nodes 108a and 108b. The gas flowmeter 1000 then calculates a gas flow rate based on the magnitude of the thermo-electromotive force.

In the case of a strong gas flow, however, the heating wire 106 is exposed to the strong gas flow and is cooled, which makes it difficult for the thermocouple 104 to measure a gas flow rate. For a strong gas flow, the gas flowmeter 1000 detects the substrate temperature T of the printed substrate 103 by using the thermistor element 105, and calculates a gas flow rate based on the detected substrate temperature T.

Patent Document 1: Japanese Unexamined Patent Application Publication No. 2008-241318

SUMMARY OF THE INVENTION

The above-described gas flowmeter 1000 measures a thermo-electromotive force generated between the nodes 108a and 108b or the substrate temperature T of the printed substrate 103 detected by the thermistor element 105, based on the magnitude of the voltage. The measurements are thus vulnerable to noise, which decreases the measurement accuracy of a gas flow rate. Additionally, in the gas flowmeter 1000, highly accurate, regular calibration is required for the thermo-electromotive force detecting circuit 110 and the thermometer circuit 111, which increases the burden of maintenance. If regular calibration is not performed or calibration is not accurately performed for the thermo-electromotive force detecting circuit 110 and the thermometer circuit 111, the gas flowmeter 1000 fails to measure a correct gas flow rate.

Additionally, the gas flowmeter 1000 has a complicated structure and is not easy to manufacture. The gas flowmeter 1000 also requires an expensive element, such as the A/D converter 112, and is not possible to manufacture at low cost.

The present invention has been made to solve the above-described problems of the related art. As measures to solve the problems, an airflow velocity measuring apparatus of the present invention includes a fixed-temperature heat generating device that generates heat at or around a preset temperature. The fixed-temperature heat generating device includes a power supply, a heating element, a switching element, a comparator element, a first negative-temperature-coefficient thermistor element, and plural resistor elements. The heating element and the first negative-temperature-coefficient thermistor element are disposed at a measuring point at which a velocity of airflow is measured. The heating element is caused to generate heat by the power supply. The switching element is inserted between the power supply and the heating element. The comparator element controls ON and OFF of the switching element. The first negative-temperature-coefficient thermistor element is disposed near the heating element and is thermally coupled with the heating element so as to be able to accurately detect the temperature of the heating element. The resistance value of the first negative-temperature-coefficient thermistor element at the preset temperature is used as a threshold resistance value. The first negative-temperature-coefficient thermistor element and at least one of the plural resistor elements are connected in series with each other so as to form a temperature-detecting voltage divider circuit. A temperature-detecting voltage is output from a node between the first negative-temperature-coefficient thermistor element and the at least one of the plural resistor elements of the temperature-detecting voltage divider circuit. At least two of the plural resistor elements are connected in series with each other so as to form a comparison voltage divider circuit. A comparison voltage is output from a node between one resistor element and another resistor element of the at least two of the plural resistor elements of the comparison voltage divider circuit. The comparator element compares the temperature-detecting voltage and the comparison voltage with each other and turns ON or OFF the switching element in accordance with a comparison result. As a result of the switching element being repeatedly turned ON and OFF, a pulse voltage is applied from the power supply to the heating element. The airflow velocity measuring apparatus measures the velocity of airflow at the measuring point based on a waveform of the applied pulse voltage. One of the at least two of the plural resistor elements forming the comparison voltage divider circuit includes at least a first divided resistor element, a second divided resistor element, and a second negative-temperature-coefficient thermistor element connected in series with each other. The airflow velocity measuring apparatus further includes a switch that switches between a first state in which both the first and second divided resistor elements are connected to the comparison voltage divider circuit and a second state in which only one of the first and second divided resistor elements is connected to the comparison voltage divider circuit.

In this airflow velocity measuring apparatus, a fixed voltage may be applied to the temperature-detecting voltage divider circuit, and a fixed voltage may be applied to the comparison voltage divider circuit. The resistance value of the at least one of the plural resistor elements of the temperature-detecting voltage divider circuit, the resistance values of the at least two of the plural resistor elements of the comparison voltage divider circuit, and the fixed voltage applied to each of the temperature-detecting voltage divider circuit and the comparison voltage divider circuit may be set so that the temperature-detecting voltage and the comparison voltage become equal to each other when the temperature of the first negative-temperature-coefficient thermistor element is the preset temperature and when the resistance value of the first negative-temperature-coefficient thermistor element is the threshold resistance value. When the temperature of the first negative-temperature-coefficient thermistor element is lower than the preset temperature and when the resistance value of the first negative-temperature-coefficient thermistor element is greater than the threshold resistance value, the temperature-detecting voltage may be greater than the comparison voltage, and when the temperature of the first negative-temperature-coefficient thermistor element is higher than the preset temperature and when the resistance value of the first negative-temperature-coefficient thermistor element is smaller than the threshold resistance value, the temperature-detecting voltage may be smaller than the comparison voltage. Alternatively, when the temperature of the first negative-temperature-coefficient thermistor element is lower than the preset temperature and when the resistance value of the first negative-temperature-coefficient thermistor element is greater than the threshold resistance value, the temperature-detecting voltage may be smaller than the comparison voltage, and when the temperature of the first negative-temperature-coefficient thermistor element is higher than the preset temperature and when the resistance value of the first negative-temperature-coefficient thermistor element is smaller than the threshold resistance value, the temperature-detecting voltage may be greater than the comparison voltage. The comparator element may compare the temperature-detecting voltage and the comparison voltage with each other. When the temperature of the first negative-temperature-coefficient thermistor element is lower than the preset temperature and when the resistance value of the first negative-temperature-coefficient thermistor element is greater than the threshold resistance value, the comparator element may turn ON the switching element. When the temperature of the first negative-temperature-coefficient thermistor element is higher than the preset temperature and when the resistance value of the first negative-temperature-coefficient thermistor element is smaller than the threshold resistance value, the comparator element may turn OFF the switching element. The switch may switch between the first and second states in response to the temperature of airflow passing through the measuring point. With this configuration, the velocity of airflow can be measured without the occurrence of measurement errors caused by a change in the temperature of airflow.

For example, as a result of a microcomputer having detected the temperature of airflow passing through the measuring point, the switch may switch between the first and second states under control of the microcomputer. With this configuration, the switch can suitably switch between the first and second states in accordance with the temperature of airflow.

Alternatively, the switch may switch between the first and second states in response to the resistance value of the second negative-temperature-coefficient thermistor element. The resistance value is changed by the temperature of airflow passing through the measuring point. In this case, the switch can suitably switch between the first and second states in accordance with the temperature of airflow merely by using the airflow velocity measuring apparatus.

The airflow velocity measuring apparatus of the present invention may be used as an airflow rate measuring apparatus.

The airflow velocity measuring apparatus of the present invention is able to correct measurement errors caused by a change in the airflow temperature and thus achieves high accuracy of measurement. The airflow velocity measuring apparatus of the present invention is less vulnerable to noise and thus achieves high accuracy of measurement. The airflow velocity measuring apparatus of the present invention has a simple structure and is easy to manufacture. The airflow velocity measuring apparatus of the present invention does not require an expensive element, such as an A/D converter, and can be manufactured at low cost.

BRIEF DESCRIPTION OF THE DRAWINGS

FIG. 6 is an equivalent circuit diagram of a gas flowmeter 1000 disclosed in Patent Document 1.

FIG. 7 is an equivalent circuit diagram of an airflow velocity measuring apparatus 1100A used as a reference.

DETAILED DESCRIPTION OF THE PREFERRED EMBODIMENTS

Figure 1:
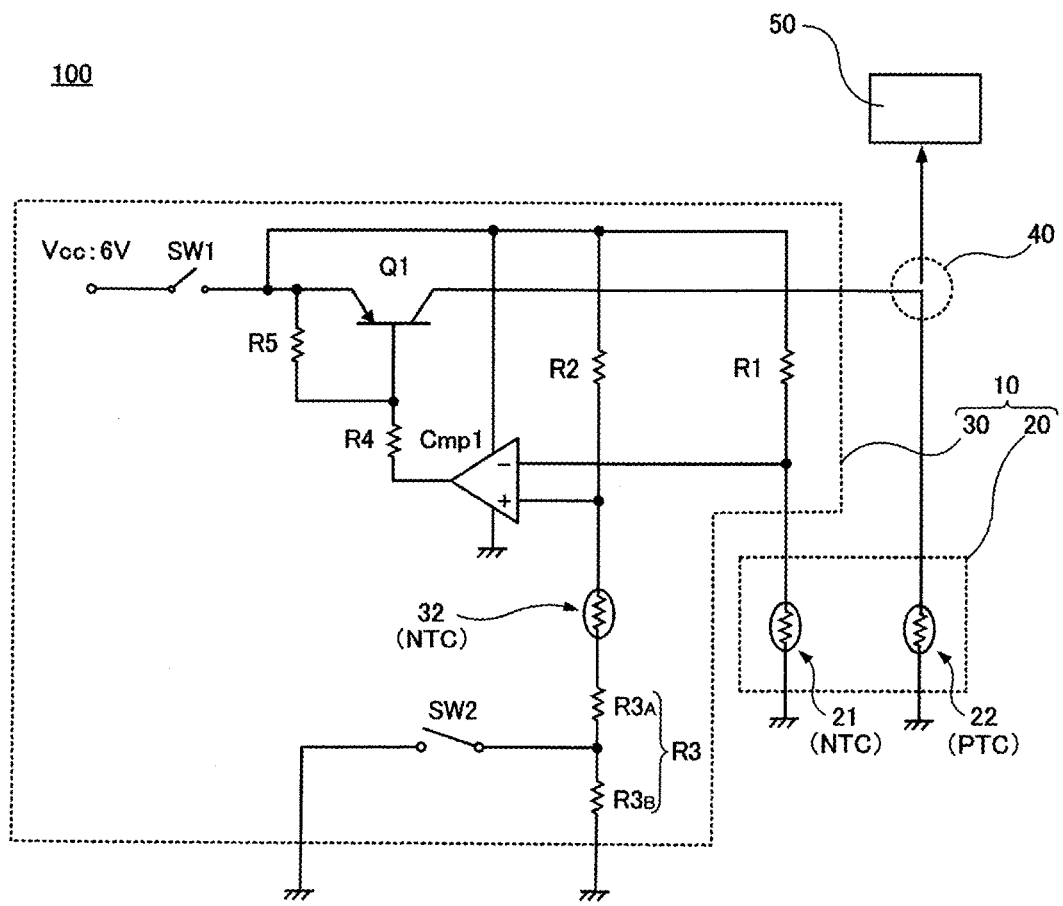
FIG. 1 is an equivalent circuit diagram of an airflow velocity measuring apparatus 100 according to a first embodiment.

Hereinafter, embodiments of the present invention will be described below with reference to the drawings. The individual embodiments merely illustrate examples of embodiments of the invention, and the invention is not restricted thereto. Different embodiments may suitably be combined with each other and be carried out, and the content of such a combined embodiment is encompassed within the invention. The drawings are provided for the better understanding of the specification and some drawings are only schematically shown. The size ratio of each component or the size ratio of one component to that of another component shown in the drawings may not match that described in the specification. Some components described in the specification may not be shown in the drawings, or a component shown in a drawing may not be as many as that described in the specification.

First Embodiment; Airflow Velocity Measuring Apparatus 100

An airflow velocity measuring apparatus 100 according to a first embodiment is shown in FIG. 1.

Before completing the invention of this application, the inventor of this application has developed an airflow velocity measuring apparatus 1100A (see FIG. 7) as a reference outside the scope of the invention of this application. The airflow velocity measuring apparatus 1100A achieves high accuracy of measurement and has a simple structure and is easy to manufacture at low cost without requiring an expensive element, such as an A/D converter. In the airflow velocity measuring apparatus 1100A, however, measurement errors occur in the airflow velocity caused by a rise or a fall in the temperature of subject airflow.

To address this issue, the inventor of this application has made improvements in the airflow velocity measuring apparatus 1100A and developed an airflow velocity measuring apparatus 1100B (see FIG. 9) used as a reference outside the scope of the invention of this application. The airflow velocity measuring apparatus 1100B has a function of suitably correcting measurement errors in the airflow velocity caused by a rise or a fall in the temperature of subject airflow. The airflow velocity measuring apparatus 1100B is able to measure the airflow velocity with high accuracy without being influenced by a rise or a fall in the temperature of subject airflow. However, the airflow velocity measuring apparatus 1100B can correct measurement errors in the airflow velocity only within a limited range of temperatures.

To address this issue, the inventor of this application has made improvements in the airflow velocity measuring apparatus 1100B and completed the invention of this application. That is, the airflow velocity measuring apparatus of the invention of this application is free from the problem found in the airflow velocity measuring apparatus 1100B, and can suitably correct measurement errors in the airflow velocity over a wide temperature range.

In view of the background and history that have led to the completion of the invention of this application, before the airflow velocity measuring apparatus 100 according to the first embodiment is explained, the airflow velocity measuring apparatuses 1100A and 1100B used as references outside the scope of the invention of this application will be discussed below.

(Airflow Velocity Measuring Apparatus 1100A as Reference)

The airflow velocity measuring apparatus 1100A used as a reference outside the scope of the invention of this application is shown in FIG. 7.

The airflow velocity measuring apparatus 1100A includes a fixed-temperature heat generating device 210. The preset temperature of the fixed-temperature heat generating device 210 is about 40° C. That is, the fixed-temperature heat generating device 210 is designed to generate heat at a fixed temperature of about 40° C.

The fixed-temperature heat generating device 210 includes a heating unit 220 and a temperature controller 230.

The heating unit 220 includes a first negative-temperature-coefficient thermistor element 221 and a positive-temperature-coefficient thermistor element 222, which is a heating element. The first negative-temperature-coefficient thermistor element 221 and the positive-temperature-coefficient thermistor element 222 are thermally coupled with each other. The first negative-temperature-coefficient thermistor element 221 is used for measuring the temperature of the positive-temperature-coefficient thermistor element 222. As the positive-temperature-coefficient thermistor element 222, a heating element having a resistance value of 68 kΩ at 25° C. is used. The type of heating element is not limited to the positive-temperature-coefficient thermistor element 222, and a heater element may alternatively be used.

The temperature controller 230 includes a power supply Vcc. A direct current of 6 V, for example, is used as the power supply Vcc. A switch SW1 is connected to the power supply Vcc as a power supply switch.

The temperature controller 230 includes a switching element Q1. The switching element Q1 is connected at one end to the switch SW1 and at the other end to the positive-temperature-coefficient thermistor element 222. The switching element Q1 switches ON and OFF of power supply from the power supply Vcc to the positive-temperature-coefficient thermistor element 222. As the switching element Q1, a PNP transistor, for example, is used.

The temperature controller 230 includes a resistor element R201. The resistor element R201 is connected in series with the first negative-temperature-coefficient thermistor element 221 so as to form a temperature-detecting voltage divider circuit. The temperature-detecting voltage divider circuit outputs a temperature-detecting voltage from a node between the resistor element R201 and the first negative-temperature-coefficient thermistor element 221.

The temperature controller 230 includes a comparison voltage divider circuit having resistor elements R202 and R203 connected in series with each other. The comparison voltage divider circuit outputs a comparison voltage from a node between the resistor elements R202 and R203.

The temperature controller 230 includes a comparator element Cmp1.

The node between the resistor element R201 and the first negative-temperature-coefficient thermistor element 221 forming the temperature-detecting voltage divider circuit is connected to the inverting input terminal – of the comparator element Cmp1.

The node between the resistor elements R202 and R203 forming the comparison voltage divider circuit is connected to the non-inverting input terminal + of the comparator element Cmp1.

The positive power supply terminal of the comparator element Cmp1 is connected to the load terminal of the switch SW1.

The negative power supply terminal of the comparator element Cmp1 is connected to a ground.

The output terminal of the comparator element Cmp1 is connected to the control terminal of the switching element Q1 via a resistor element R204.

A node between the resistor element R204 and the switching element Q1 is connected to the load terminal of the switch SW1 via a resistor element R205.

The resistance values of the resistor elements R201, R202, and R203 are shown in Table 1. The resistance-temperature characteristics of the first negative-temperature-coefficient thermistor element 221 are shown in Table 2. Table 1 also shows the resistance value of the first negative-temperature-coefficient thermistor element 221 at 40° C. The resistance values of the resistor elements R204 and R205 are suitably set.

TABLE 1

| | Resistance value | Voltage |
|---|---|---|
| R201 | 4.7 kΩ | <<Temperature-detecting voltage at 40° C.>> |
| 221 (NTC) | 5.6 kΩ (Resistance value at 40° C.) | $\frac{5.6}{4.7+5.6} \times 6.0 \approx 3.26\,(V\colon 40°\,C.)$ |
| R202 | 4.7 kΩ | <<Comparison voltage>> |
| R203 | 5.6 kΩ | $\frac{5.6}{4.7+5.6} \times 6.0 \approx 3.26\,(V)$ |

TABLE 2

| Resistance-temperature characteristics of first negative-temperature-coefficient thermistor 221 | |
|---|---|
| 25° C. | 10 kΩ |
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

When using the airflow velocity measuring apparatus 1100A, the heating unit 220 having the thermally coupled first negative-temperature-coefficient thermistor element 221 and positive-temperature-coefficient thermistor element 222 is placed in the flow channel of subject airflow.

For example, at an ambient temperature of 25° C., the switch SW1 of the fixed-temperature heat generating device 210 is turned ON, and then, a voltage of 6 V is applied to the temperature-detecting voltage divider circuit having the series-connected resistor element R201 and first negative-temperature-coefficient thermistor element 221 and to the comparison voltage divider circuit having the series-connected resistor elements R202 and R203. At this time, the resistance value of the resistor element R201 of the temperature-detecting voltage divider circuit is 4.7 kΩ, and the resistance value of the first negative-temperature-coefficient thermistor element 221 is 10 kΩ (see Table 2). The resulting voltage output from the temperature-detecting voltage divider circuit to the inverting input terminal – of the comparator element Cmp1 is about 4.08 V. The resistance value of the resistor element R202 of the comparison voltage divider circuit is 4.7 kΩ, and that of the resistor element R203 is 5.6 kΩ. The resulting voltage output from the comparison voltage divider circuit to the non-inverting input terminal + of the comparator element Cmp1 is about 3.26 V.

If the resulting voltage output from the temperature-detecting voltage divider circuit to the inverting input terminal – is greater than that output from the comparison voltage divider circuit to the non-inverting input terminal +, the comparator element Cmp1 turns ON the switching element Q1. Conversely, if the resulting voltage output from the temperature-detecting voltage divider circuit to the inverting input terminal – is smaller than that output from the comparison voltage divider circuit to the non-inverting input terminal +, the comparator element Cmp1 turns OFF the switching element Q1.

When the switch SW1 of the fixed-temperature heat generating device 210 is turned ON, the resulting voltage output from the temperature-detecting voltage divider circuit to the inverting input terminal – is greater than that output from the comparison voltage divider circuit to the non-inverting input terminal +. The comparator element Cmp1 thus turns ON the switching element Q1. As a result of turning ON the switch SW1 of the fixed-temperature heat generating device 210, power is supplied from the power supply Vcc to the positive-temperature-coefficient thermistor element 222 via the switching element Q1, so that the positive-temperature-coefficient thermistor element 222 starts generating heat.

As the temperature of the positive-temperature-coefficient thermistor element 222 rises, the temperature of the thermally coupled first negative-temperature-coefficient thermistor element 221 also rises, and the resistance value of the first negative-temperature-coefficient thermistor element 221 drops. The resulting voltage output from the temperature-detecting voltage divider circuit to the inverting input terminal – starts to drop from about 4.08 V, which is the initial value.

The temperatures of the positive-temperature-coefficient thermistor element 222 and the first negative-temperature-coefficient thermistor element 221 rise to 40° C., which is the preset temperature, and the resistance value of the first negative-temperature-coefficient thermistor element 221 drops to 5.6 kΩ. The resulting voltage output from the temperature-detecting voltage divider circuit drops to about 3.26 V, which is the same voltage output from the comparison voltage divider circuit. At this time point, the comparator element Cmp1 turns OFF the switching element Q1 to stop supplying power from the power supply Vcc to the positive-temperature-coefficient thermistor element 222.

As a result of stopping supplying power from the power supply Vcc to the positive-temperature-coefficient thermistor element 222, the temperature of the positive-temperature-coefficient thermistor element 222 and the first negative-temperature-coefficient thermistor element 221 becomes lower than 40° C., which is the preset temperature. Then, the comparator element Cmp1 turns ON the switching element Q1 to restart supplying power from the power supply Vcc to the positive-temperature-coefficient thermistor element 222.

In this manner, as a result of repeatedly supplying and stopping power to the positive-temperature-coefficient thermistor element 222, the fixed-temperature heat generating device 210 maintains the temperature of the positive-temperature-coefficient thermistor element 222 and the first negative-temperature-coefficient thermistor element 221 at around 40° C., which is the preset temperature.

Figure 8A:
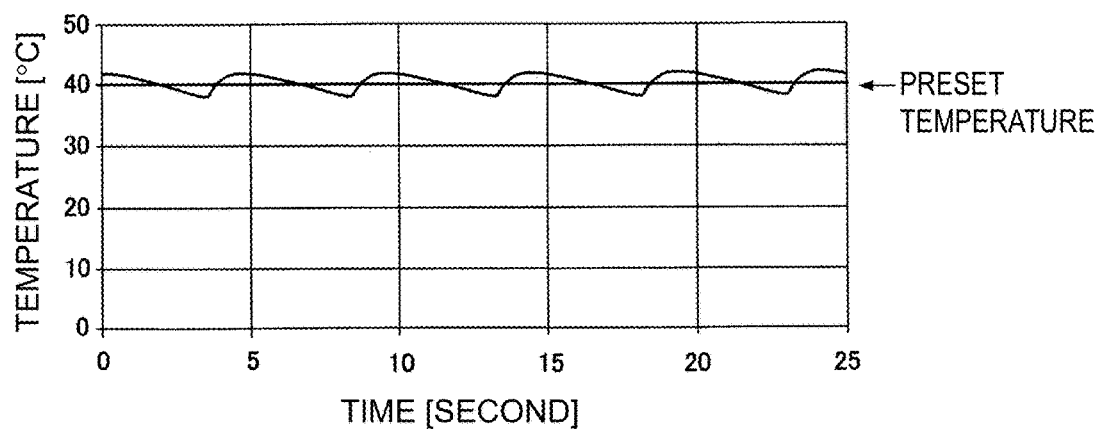
FIG. 8(A) is a graph illustrating the temperature transition of a positive-temperature-coefficient thermistor element 222 and a first negative-temperature-coefficient thermistor element 221 at a certain airflow velocity in the airflow velocity measuring apparatus 1100A.
Figure 8B:
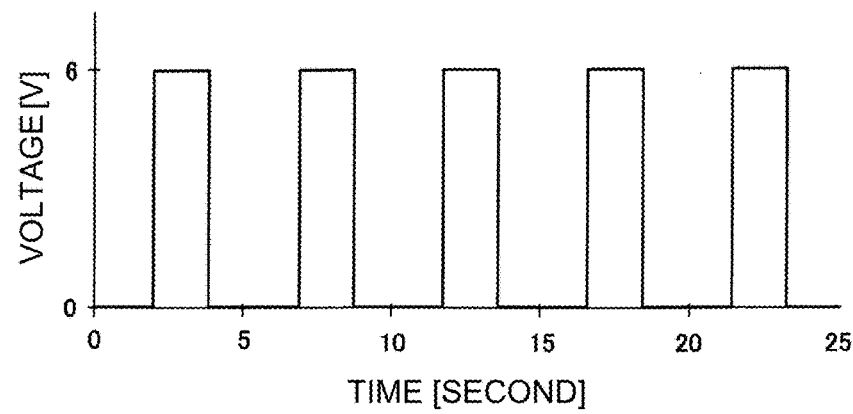
FIG. 8(B) is a graph illustrating the pulse voltage supplied from a power supply Vcc to the positive-temperature-coefficient thermistor element 222 in accordance with a time change in FIG. 8(A).

The temperature transition of the positive-temperature-coefficient thermistor element 222 and the first negative-temperature-coefficient thermistor element 221 at a certain airflow velocity is illustrated in FIG. 8(A). The voltage supplied from the power supply Vcc to the positive-temperature-coefficient thermistor element 222 in accordance with a time change in FIG. 8(A) is illustrated in FIG. 8(B). FIG. 8(B) shows that a regular, a pulsating voltage (hereinafter called a pulse voltage) is supplied from the power supply Vcc to the positive-temperature-coefficient thermistor element 222.

As shown in FIG. 7, in the airflow velocity measuring apparatus 1100A, a pulse voltage monitor 240 is disposed between the switching element Q1 of the temperature controller 230 and the positive-temperature-coefficient thermistor element 222 of the heating unit 220. In the pulse voltage monitor 240, the waveform of a pulse voltage is monitored by a counter of a microcomputer 250, for example. The counter of the microcomputer 250 includes a 1000-Hz oscillator, for example, and reads the value of the pulse voltage one thousand times per second to detect the waveform of the pulse voltage.

The airflow velocity measuring apparatus 1100A measures (calculates) the airflow velocity based on the duration of one "ON" time period of the waveform of the pulse voltage read by the microcomputer 250 or the duty ratio of the waveform of the pulse voltage. More specifically, as the airflow velocity increases in order of zero, low, intermediate, and high, heat is more likely to be taken away from the positive-temperature-coefficient thermistor element 222 and the first negative-temperature-coefficient thermistor element 221. The fixed-temperature heat generating device 210 thus increases the "ON" time period of the pulse voltage to be longer and the duty ratio to be higher in order to maintain the preset temperature. The airflow velocity measuring apparatus 1100A measures (calculates) the airflow velocity based on the "ON" time period or the duty ratio of the pulse voltage.

The airflow velocity measuring apparatus 1100A configured as described above achieves high accuracy of measurement and has a simple structure and is easy to manufacture at low cost without requiring an expensive element, such as an A/D converter.

In the airflow velocity measuring apparatus 1100A, however, measurement errors occur in the airflow velocity caused by a rise or a fall in the temperature of subject airflow. More specifically, if the airflow velocity measuring apparatus 1100A is designed with a preset (assumed) airflow temperature of an ambient temperature of 25° C., when the airflow temperature becomes higher than 25° C., the duty ratio of the waveform of a detected pulse voltage becomes lower than that corresponding to the actual airflow velocity under the influence of a rise in the airflow temperature. The reason for this is as follows. When the airflow temperature becomes higher than 25° C., the temperature of the positive-temperature-coefficient thermistor element 222 and the first negative-temperature-coefficient thermistor element 221 rises faster than that at a temperature of 25° C. because of a rise in the airflow temperature. Conversely, when the airflow temperature becomes lower than 25° C., the duty ratio of the waveform of a detected pulse voltage becomes higher than that corresponding to the actual airflow velocity under the influence of a fall in the airflow temperature. The reason for this is as follows. When the airflow temperature becomes lower than 25° C., the temperature of the positive-temperature-coefficient thermistor element 222 and the first negative-temperature-coefficient thermistor element 221 rises more slowly than that at a temperature of 25° C. because of a fall in the airflow temperature.

In this manner, the following problem arises in the airflow velocity measuring apparatus 1100A. When the airflow temperature becomes higher than 25° C., the duty ratio of the waveform of a detected pulse voltage becomes lower than that corresponding to the actual airflow velocity. Conversely, when the airflow temperature becomes lower than 25° C., the duty ratio of the waveform of a detected pulse voltage becomes higher than that corresponding to the actual airflow velocity.

To address this issue, the inventor of this application has made improvements in the airflow velocity measuring apparatus 1100A and developed the airflow velocity measuring apparatus 1100B having a function of suitably correcting measurement errors in the airflow velocity caused by a rise or a fall in the temperature of subject airflow.

(Airflow Velocity Measuring Apparatus 1100B as Reference)

Figure 9:
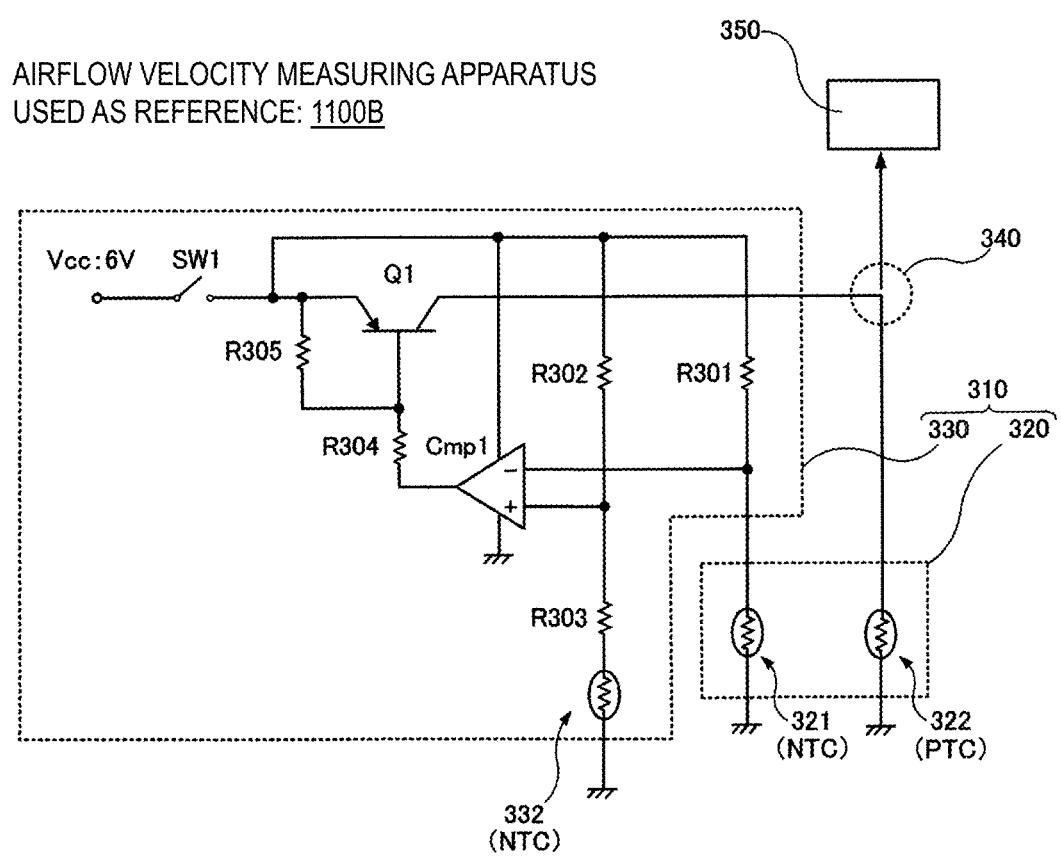
FIG. 9 is an equivalent circuit diagram of an airflow velocity measuring apparatus 1100B used as a reference.

The airflow velocity measuring apparatus 1100B used as a reference outside the scope of the invention of this application is shown in FIG. 9.

The airflow velocity measuring apparatus 1100B includes a fixed-temperature heat generating device 310. The preset temperature of the fixed-temperature heat generating device 310 is about 35° C. The fixed-temperature heat generating device 310 includes a heating unit 320 and a temperature controller 330.

The heating unit 320 includes a first negative-temperature-coefficient thermistor element 321, which is a first temperature sensor element, and a positive-temperature-coefficient thermistor element 322, which is a heating element. As the first negative-temperature-coefficient thermistor element 321, the same thermistor element as the first negative-temperature-coefficient thermistor element 221 of the airflow velocity measuring apparatus 1100A is used. As the positive-temperature-coefficient thermistor element 322, the same thermistor element as the positive-temperature-coefficient thermistor element 222 of the airflow velocity measuring apparatus 1100A is used.

As in the airflow velocity measuring apparatus 1100A, the temperature controller 330 includes a power supply Vcc. A direct current of 6 V, for example, is used as the power supply Vcc. A switch SW1 is connected to the power supply Vcc as a power supply switch.

As in the airflow velocity measuring apparatus 1100A, the temperature controller 330 includes a switching element Q1.

The temperature controller 330 includes a resistor element R301. The resistor element R301 is connected in series with the first negative-temperature-coefficient thermistor element 321 so as to form a temperature-detecting voltage divider circuit. The temperature-detecting voltage divider circuit outputs a temperature-detecting voltage from a node between the resistor element R301 and the first negative-temperature-coefficient thermistor element 321.

The temperature controller 330 includes a comparison voltage divider circuit having resistor elements R302 and R303 and a second negative-temperature-coefficient thermistor 332 connected in series with each other. The second negative-temperature-coefficient thermistor 332 serves to correct measurement errors in the airflow velocity caused by a rise or a fall in the temperature of subject airflow. The comparison voltage divider circuit outputs a comparison voltage from a node between the resistor elements R302 and R303. As the second negative-temperature-coefficient thermistor 232, a thermistor element having the same resistance-temperature characteristics as the first negative-temperature-coefficient thermistor element 321 is used.

The second negative-temperature-coefficient thermistor 332 is disposed near the heating unit 320 such that it is thermally separated from the positive-temperature-coefficient thermistor element 322 and the first negative-temperature-coefficient thermistor element 321 of the heating unit 320. In accordance with the temperature of subject airflow, the second negative-temperature-coefficient thermistor 232 changes its temperature and changes its resistance.

As in the airflow velocity measuring apparatus 1100A, the temperature controller 330 includes a comparator element Cmp1.

The output terminal of the comparator element Cmp1 is connected to the control terminal of the switching element Q1 via a resistor element R304. A node between the resistor element R304 and the switching element Q1 is connected to the load terminal of the switch SW1 via a resistor element R305.

The resistance values of the resistor elements R301, R302, and R303 are shown in Table 3. The resistance-temperature characteristics of the first negative-temperature-coefficient thermistor element 321 and the second negative-temperature-coefficient thermistor 332 are shown in Table 4. The resistance values of the resistor elements R304 and R305 are suitably set.

TABLE 3

| | Resistance value |
|---|---|
| R301 | 22 kΩ |
| R302 | 33 kΩ |
| R303 | 820 Ω |

TABLE 4

Resistance-temperature characteristics of first and second negative-temperature-coefficient thermistors 321 and 332

| | |
|---|---|
| 25° C. | 10 kΩ |
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

As in the airflow velocity measuring apparatus 1100A, the airflow velocity measuring apparatus 1100B includes a pulse voltage monitor 340. In the pulse voltage monitor 340, the waveform of a pulse voltage is monitored by a counter of a microcomputer 350, for example.

As a result of selecting the resistance values of the resistor elements R301, R302, and R303 and the resistance-temperature characteristics of the first negative-temperature-coefficient thermistor element 321 and the second negative-temperature-coefficient thermistor 332, as indicated in Table 3 and Table 4, the airflow velocity measuring apparatus 1100B can correct measurement errors in the airflow velocity caused by a rise or a fall in the temperature of subject airflow.

More specifically, when the temperature of airflow measured at the second negative-temperature-coefficient thermistor 332 becomes higher than 25° C., the airflow velocity measuring apparatus 1100B adjusts the preset temperature of the fixed-temperature heat generating device 310 to be higher than 35° C., which is the initial preset temperature. When the temperature of the airflow becomes lower than 25° C., the airflow velocity measuring apparatus 1100B adjusts the preset temperature of the fixed-temperature heat generating device 310 to be lower than 35° C., which is the initial preset temperature. As a result, the duty ratio of a pulse voltage supplied from the power supply Vcc to the positive-temperature-coefficient thermistor element 322 changes solely by the velocity of subject airflow regardless of whether the airflow temperature rises or falls. That is, the airflow velocity measuring apparatus 1100B is able to detect a highly accurate airflow velocity without the occurrence of measurement errors caused by a rise or a fall in the airflow temperature.

However, the airflow velocity measuring apparatus 1100B can correct such measurement errors in the airflow velocity only within a limited range of temperatures. The range of temperatures within which measurement errors in the airflow velocity can be corrected is changed in accordance with the resistance value of the resistor element R303 forming the comparison voltage divider circuit.

Figure 10:
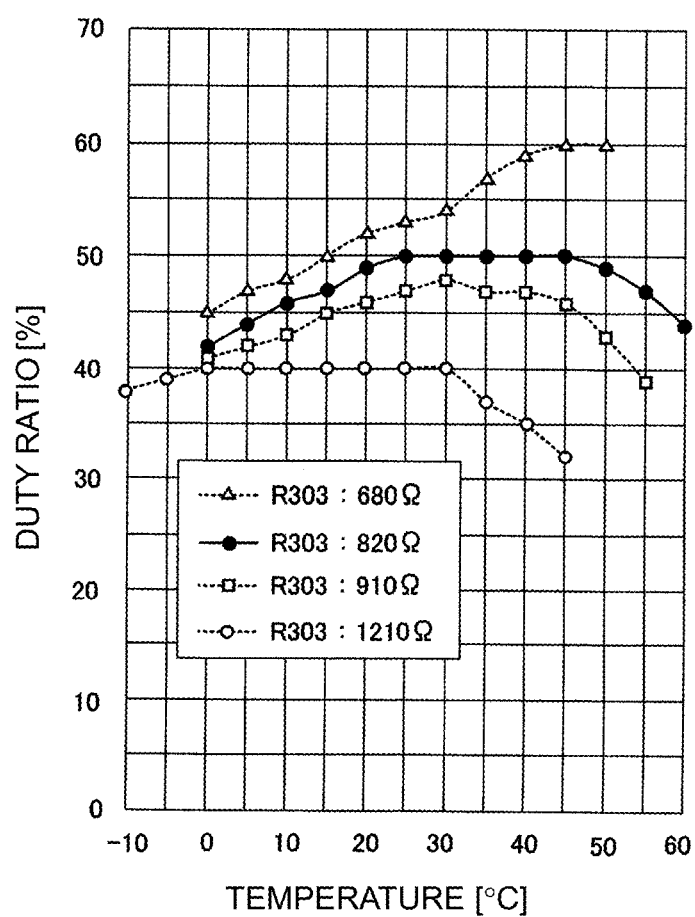
FIG. 10 is a graph illustrating the relationship between the airflow temperature and the duty ratio of a pulse voltage when the airflow velocity is 5 m/second in the airflow velocity measuring apparatus 1100B.

As discussed above, in the airflow velocity measuring apparatus 1100B, the resistance value of the resistor element R303 is set to be 820Ω. FIG. 10 is a graph illustrating the relationship between the airflow temperature and the duty ratio of a pulse voltage when the airflow velocity is 5 m/second in the airflow velocity measuring apparatus 1100B including the resistor element R303 of 820Ω (solid line in the graph).

As is seen from FIG. 10, in the airflow velocity measuring apparatus 1100B including the resistor element R303 of 820Ω, when the airflow temperature is about 25 to 50° C., the duty ratio of the pulse voltage is flat without being influenced by a change in the airflow temperature. That is, when the airflow temperature is about 25 to 50° C., the airflow velocity measuring apparatus 1100B including the resistor element R303 of 820Ω is able to suitably correct measurement errors in the airflow velocity caused by a rise or a fall in the airflow temperature. In other words, when the airflow temperature is lower than 25° C. or exceeds 50° C., the airflow velocity measuring apparatus 1100B is unable to correct such measurement errors.

As described above, the range of temperatures within which measurement errors in the airflow velocity can be corrected is changed in accordance with the resistance value of the resistor element R303 forming the comparison voltage divider circuit. FIG. 10 also illustrates the relationship between the airflow temperature and the duty ratio of the pulse voltage at an airflow velocity of 5 m/second when the resistance value of the resistor element R303 is varied to 680 Ω, 910Ω, and 1210Ω (broken lines in the graph).

As is seen from FIG. 10, when the resistance value of the resistor element R303 is changed to 1210Ω, the duty ratio of the pulse voltage becomes flat without being influenced by a change in the airflow temperature in a range of about 0 to 30° C. In other words, when the resistance value of the resistor element R303 is changed to 1210Ω, measurement errors in the airflow velocity caused by a rise or a fall in the airflow temperature can be corrected in a range of the airflow temperature of about 0 to 30° C.

The inventor of this application has thus made improvements in the airflow velocity measuring apparatus 1100B and completed the invention of this application. That is, in the airflow velocity measuring apparatus of the invention of this application, the resistance value of the resistor element R303 is changed in accordance with whether the temperature of subject airflow is lower than a predetermined temperature (30° C., for example) or higher than the predetermined temperature. Then, measurement errors in the airflow velocity caused by a rise or a fall in the airflow temperature can suitably be corrected over a wide temperature range.

(Airflow Velocity Measuring Apparatus 100)

As described above, the airflow velocity measuring apparatus 100 according to the first embodiment is shown in FIG. 1. FIG. 1 is an equivalent circuit diagram of the airflow velocity measuring apparatus 100.

The airflow velocity measuring apparatus 100 includes a fixed-temperature heat generating device 10. The preset temperature of the fixed-temperature heat generating device 10 is about 35° C. That is, the fixed-temperature heat generating device 10 is designed to generate heat at a fixed temperature of about 35° C.

The fixed-temperature heat generating device 10 includes a heating unit 20 and a temperature controller 30.

The heating unit 20 includes a first negative-temperature-coefficient thermistor element 21 and a positive-temperature-coefficient thermistor element 22, which is a heating element. The first negative-temperature-coefficient thermistor element 21 and the positive-temperature-coefficient thermistor element 22 are thermally coupled with each other. The first negative-temperature-coefficient thermistor element 21 is used for measuring the temperature of the positive-temperature-coefficient thermistor element 22. As the positive-temperature-coefficient thermistor element 22, a thermistor element having a resistance value of 68 kΩ at 25° C. is used. The type of heating element is not limited to the positive-temperature-coefficient thermistor element 22, and a heater element may alternatively be used.

The temperature controller 30 includes a power supply Vcc. A direct current of 6 V, for example, is used as the power supply Vcc. A first switch SW1 is connected to the power supply Vcc as a power supply switch.

The temperature controller 30 includes a switching element Q1. The switching element Q1 is connected at one end to the first switch SW1 and at the other end to the positive-temperature-coefficient thermistor element 22. The switching element Q1 switches ON and OFF of power supply from the power supply Vcc to the positive-temperature-coefficient thermistor element 22. As the switching element Q1, a PNP transistor is used. However, the type of switching element Q1 is not limited to a PNP transistor, and another type of switching element may be used.

The temperature controller 30 includes a resistor element R1. The resistor element R1 is connected in series with the first negative-temperature-coefficient thermistor element 21 so as to form a temperature-detecting voltage divider circuit. The temperature-detecting voltage divider circuit outputs a temperature-detecting voltage from a node between the resistor element R1 and the first negative-temperature-coefficient thermistor element 21.

The temperature controller 30 includes a comparison voltage divider circuit having a resistor element R2, a second negative-temperature-coefficient thermistor element 32, and a resistor element R3 connected in series with each other. In practice, the resistor element R3 is divided into two resistor elements, that is, first and second divided resistor elements $R3_A$ and $R3_B$. The comparison voltage divider circuit outputs a comparison voltage from a node between the resistor element R2 and the second negative-temperature-coefficient thermistor element 32.

The temperature controller 30 includes a comparator element Cmp1.

The node between the resistor element R1 and the first negative-temperature-coefficient thermistor element 21 forming the temperature-detecting voltage divider circuit is connected to the inverting input terminal − of the comparator element Cmp1.

The node between the resistor element R2 and the second negative-temperature-coefficient thermistor element 32 forming the comparison voltage divider circuit is connected to the non-inverting input terminal + of the comparator element Cmp1.

The positive power supply terminal of the comparator element Cmp1 is connected to the load terminal of the first switch SW1.

The negative power supply terminal of the comparator element Cmp1 is connected to a ground.

The output terminal of the comparator element Cmp1 is connected to the control terminal of the switching element Q1 via a resistor element R4.

A node between the resistor element R4 and the switching element Q1 is connected to the load terminal of the switch SW1 via a resistor element R5.

The temperature controller 30 includes a second switch SW2 between a ground and a node between the first and second divided resistor elements $R3_A$ and $R3_B$. The second switch SW2 is turned OFF when the temperature of subject airflow is lower than 30° C. and is turned ON when the temperature of subject airflow is 30° C. or higher.

As a result, when the temperature of subject airflow is lower than 30° C., the resistance value of the resistor element R3 forming the comparison voltage divider circuit becomes equal to the added value of the resistance values of the first and second divided resistor elements $R3_A$ and $R3_B$. When the temperature of subject airflow is 30° C. or higher, the resistance value of the resistor element R3 becomes equal to that of only the first divided resistor element $R3_A$.

The resistance values of the resistor elements R1, R2, and R3 and the first and second divided resistor elements $R3_A$ and $R3_B$ are shown in Table 5. The resistance-temperature characteristics of the first and second negative-temperature-coefficient thermistor elements 21 and 32 are shown in Table 6. The resistance values of the resistor elements R4 and R5 are suitably set.

TABLE 5

| | Resistance value | |
|---|---|---|
| R1 | 22 kΩ | |
| R2 | 33 kΩ | |
| R3 | $R3_A + R3_B$ (lower than 30° C.) | 1210 Ω |
| | $R3_A$ (30° C. or higher) | 820 Ω |
| $R3_A$ | 820 Ω | |
| $R3_B$ | 390 Ω | |

TABLE 6

Resistance-temperature characteristics of first and second negative-temperature-coefficient thermistors 21 and 32

| 25° C. | 10 kΩ |
|---|---|
| 30° C. | 8.3 kΩ |
| 35° C. | 6.9 kΩ |
| 40° C. | 5.6 kΩ |
| 45° C. | 4.9 kΩ |
| 50° C. | 4.2 kΩ |

According to the same principle of the airflow velocity measuring apparatuses 1100A and 1100B, as a result of turning ON the first switch SW1, the airflow velocity measuring apparatus 100 repeatedly supplies and stops power from the power supply to the positive-temperature-coefficient thermistor element 22. This maintains the temperature of the positive-temperature-coefficient thermistor element 22 and the first negative-temperature-coefficient thermistor element 21 at around 35° C., which is the preset temperature.

According to the same principle of the airflow velocity measuring apparatuses 1100A and 1100B, the airflow velocity measuring apparatus 100 measures (calculates) the velocity of subject airflow based on the duty ratio of a pulse voltage (or the duration of one "ON" time period).

According to the same principle of the airflow velocity measuring apparatus 1100B, the airflow velocity measuring apparatus 100 corrects measurement errors in the airflow velocity caused by a rise or a fall in the temperature of subject airflow. The airflow velocity measuring apparatus 100 corrects measurement errors after switching the resistance value of the resistor element R3 (first and second divided resistor elements $R3_A$ and $R3_B$) in accordance with whether the temperature of subject airflow is lower than 30° C. or higher than or equal to 30° C. That is, the airflow velocity measuring apparatus 100 corrects measurement errors by using two modes, that is, a low temperature mode to be used when the temperature of subject airflow is lower than 30° C. and a high temperature mode to be used when the temperature of subject airflow is 30° C. or higher.

Figure 2:
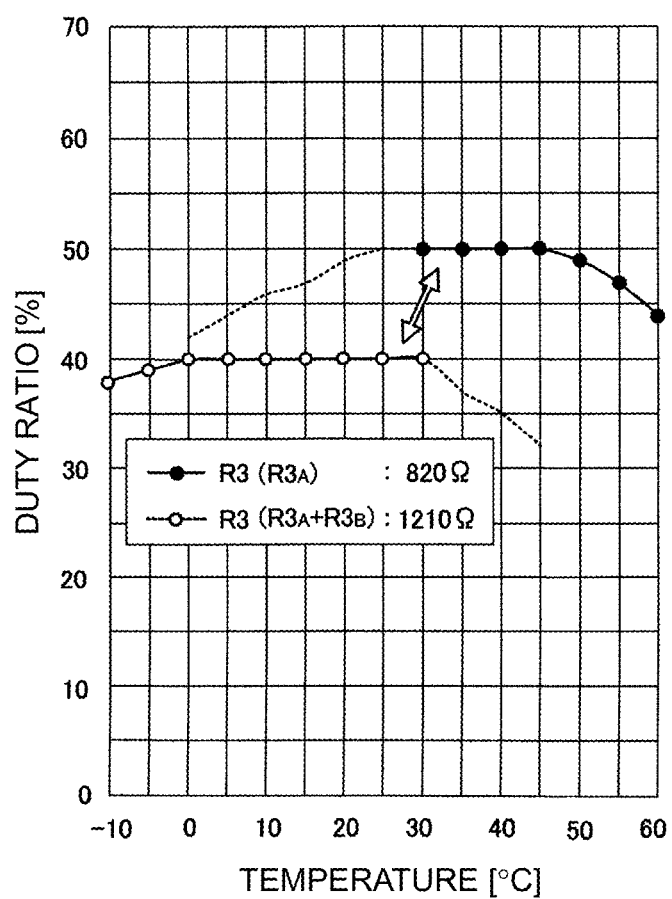
FIG. 2 is a graph illustrating the relationship between the airflow temperature and the duty ratio of a pulse voltage when the airflow velocity is 5 m/second in the airflow velocity measuring apparatus 100.

The relationship between the airflow temperature and the duty ratio of a pulse voltage when the airflow velocity is 5 m/second is shown in FIG. 2. The relationship between the airflow temperature and the duty ratio of a pulse voltage when the airflow velocity is 0 m/second (velocity is 0) is shown in FIG. 2.

As is seen from FIG. 2, in the airflow velocity measuring apparatus 100, as a result of switching between the low temperature mode and the high temperature mode in accordance with whether the temperature of subject airflow is lower than 30° C. or higher than or equal to 30° C., the duty ratio of the pulse voltage becomes constant (flat) without being influenced by a change in the airflow temperature. That is, regardless of when the airflow temperature is lower than 30° C. or 30° C. or higher, the airflow velocity measuring apparatus 100 is able to suitably correct measurement errors in the airflow velocity caused by a change in the airflow temperature.

Information concerning whether the airflow velocity measuring apparatus 100 is correcting measurement errors in the low temperature mode or the high temperature mode is transmitted from the airflow velocity measuring apparatus 100 to a microcomputer 50. By taking this information into consideration, the microcomputer 50 calculates the airflow velocity based on the waveform of a pulse voltage obtained by a pulse voltage monitor 40.

Figure 3:
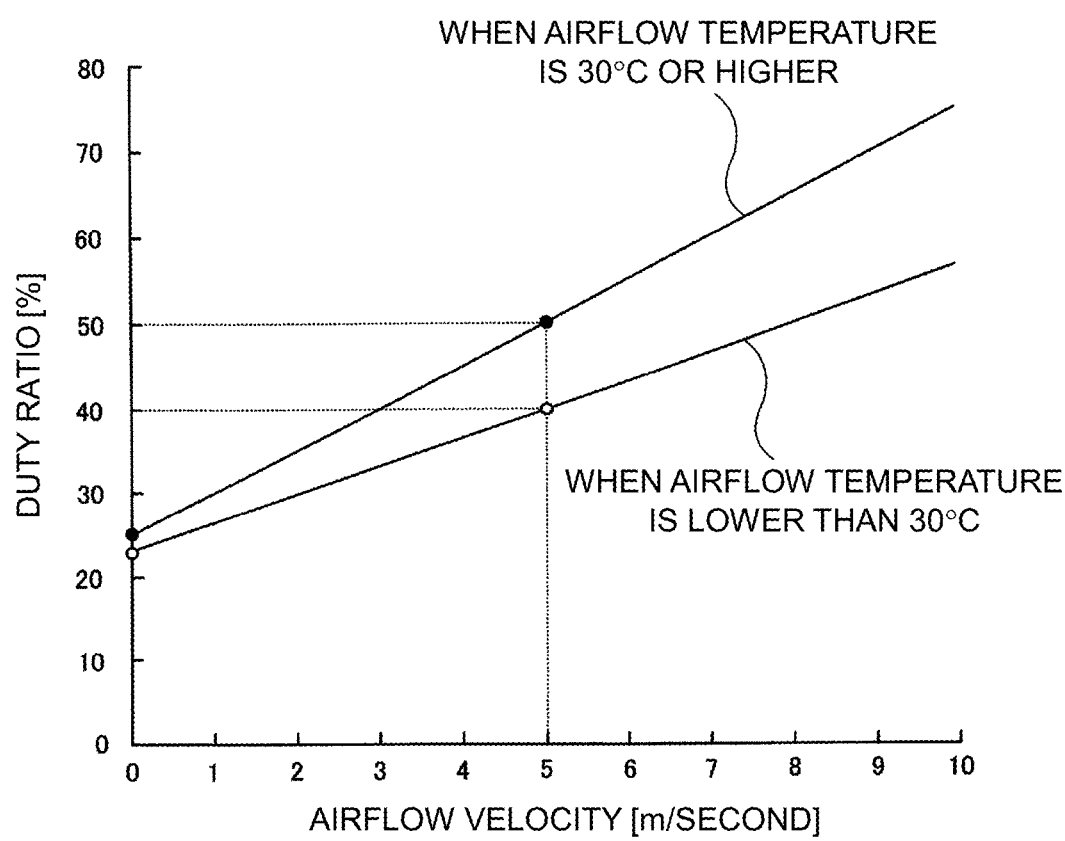
FIG. 3 is a graph illustrating the relationship between the airflow velocity and the duty ratio of a pulse voltage in the airflow velocity measuring apparatus 100.

The relationship between the velocity of subject airflow and the duty ratio of a pulse voltage is shown in FIG. 3. The airflow velocity measuring apparatus 100 selectively uses one of the two different relational expressions concerning the airflow velocity and the duty ratio of a pulse voltage in accordance with whether the airflow temperature is lower than 30° C. or higher than or equal to 30° C.

In the airflow velocity measuring apparatus 100, measurement errors in the airflow velocity caused by a change in the airflow temperature can suitably be corrected over a wide temperature range.

Second Embodiment; Airflow Velocity Measuring Apparatus 200

Figure 4:
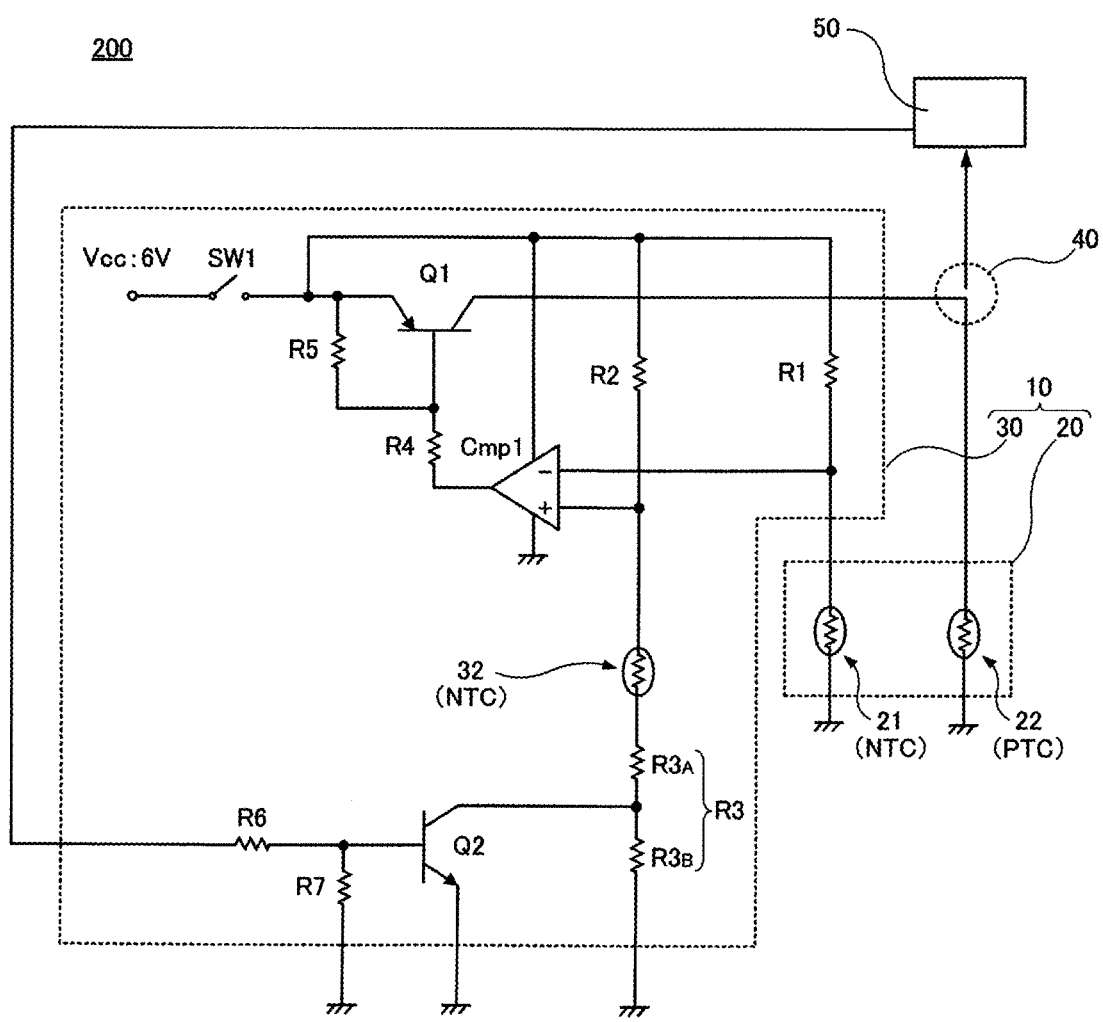
FIG. 4 is an equivalent circuit diagram of an airflow velocity measuring apparatus 200 according to a second embodiment.

An airflow velocity measuring apparatus 200 according to a second embodiment is shown in FIG. 4. FIG. 4 is an equivalent circuit diagram of the airflow velocity measuring apparatus 200.

The airflow velocity measuring apparatus 200 is an apparatus in which part of the configuration of the airflow velocity measuring apparatus 100 of the above-described first embodiment is changed. In the airflow velocity measuring apparatus 100, the second switch SW2 is provided between a ground and a node between the first and second divided resistor elements $R3_A$ and $R3_B$. In the airflow velocity measuring apparatus 200, instead of the second switch SW2, a second switching element Q2 is disposed between a ground and a node between the first and second divided resistor elements $R3_A$ and $R3_B$. In this embodiment, an NPN transistor is used as the second switching element Q2. However, the type of second switching element Q2 is not limited to an NPN transistor, and another type of switching element may be used.

The control terminal of the second switching element Q2 is connected to the microcomputer 50, so that the second switching element Q2 can be controlled by the microcomputer 50. The microcomputer 50 and the second switching element Q2 are connected with each other such that a resistor element R6 is inserted therebetween and a resistor element R7 is inserted between a ground and a node between the resistor element R6 and the second switching element Q2. The resistance values of the resistor elements R6 and R7 are suitably selected.

The microcomputer 50 obtains information concerning the temperature of subject airflow in advance. When the airflow temperature indicated by this information is found to be lower than 30° C., the microcomputer 50 turns OFF the second switching element Q2. When the airflow temperature indicated by this information is found to be 30° C. or higher, the microcomputer 50 turns ON the second switching element Q2 so as to short-circuit the node between the first and second divided resistor elements $R3_A$ and $R3_B$ and connect the node to a ground.

In the airflow velocity measuring apparatus 200, as well as in the airflow velocity measuring apparatus 100, measurement errors in the airflow velocity caused by a change in the airflow temperature can suitably be corrected over a wide temperature range.

Third Embodiment; Airflow Velocity Measuring Apparatus 300

Figure 5:
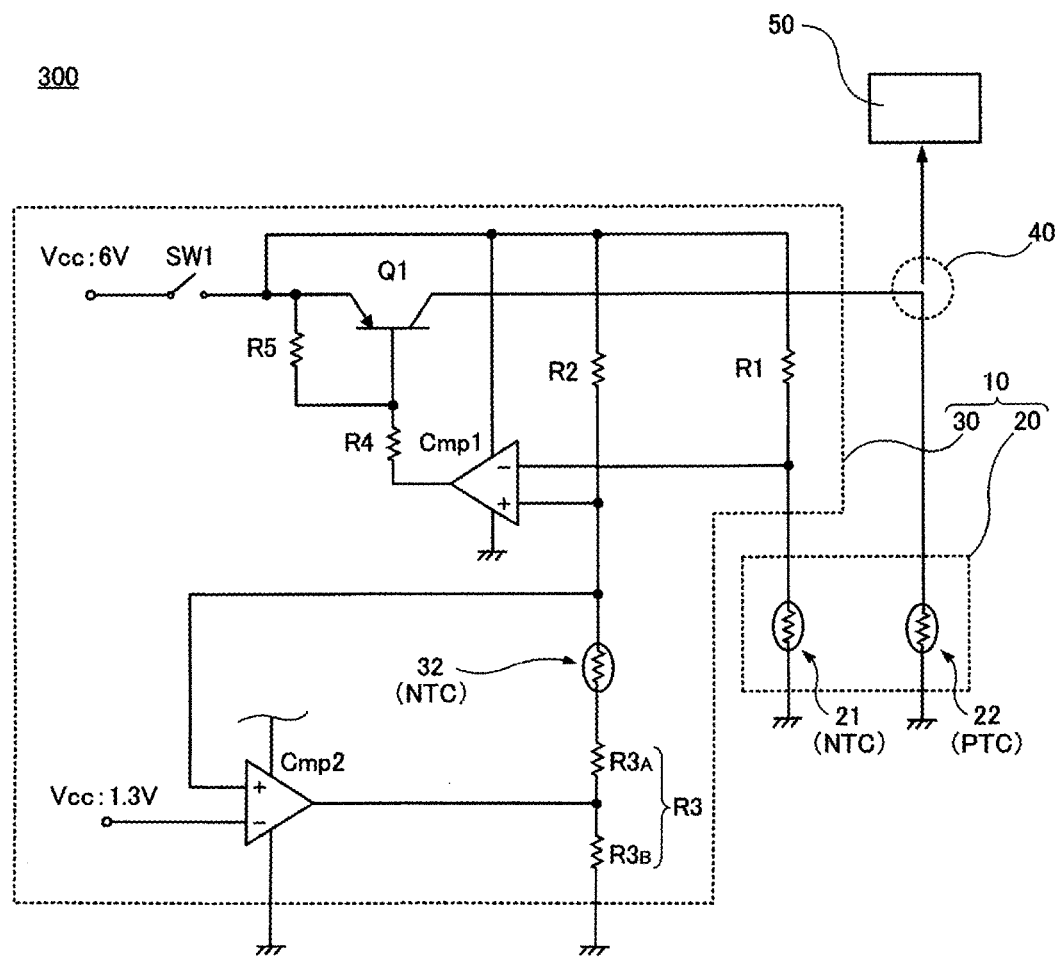
FIG. 5 is an equivalent circuit diagram of an airflow velocity measuring apparatus 300 according to a third embodiment.

An airflow velocity measuring apparatus 300 according to a third embodiment is shown in FIG. 5. FIG. 5 is an equivalent circuit diagram of the airflow velocity measuring apparatus 300.

The airflow velocity measuring apparatus 300 is also an apparatus in which part of the configuration of the airflow velocity measuring apparatus 100 of the above-described first embodiment is changed. In the airflow velocity measuring apparatus 100, the second switch SW2 is provided between a ground and a node between the first and second divided resistor elements $R3_A$ and $R3_B$. In the airflow velocity measuring apparatus 300, instead of the second switch SW2, a second comparator element Cmp2 is disposed.

A direct current of about 1.3 V is applied to the inverting input terminal − of the second comparator element Cmp2.

A node between the resistor elements R2 and R3 (first divided resistor element $R3_A$) of the comparison voltage divider circuit is connected to the non-inverting input terminal + of the second comparator element Cmp2. The output terminal of the second comparator element Cmp2 is connected to a node between the first and second divided resistor elements $R3_A$ and $R3_B$.

The second comparator element Cmp2 constantly monitors the voltage at the node between the resistor elements R2 and R3 (first divided resistor element $R3_A$) of the comparison voltage divider circuit. When the temperature of subject airflow is lower than 30° C. and the resistance value of the second negative-temperature-coefficient thermistor element 32 is 8.3 kΩ or higher and when the voltage at the above-described node is about 1.3 V or higher, the second comparator element Cmp2 is turned OFF. Conversely, when the temperature of subject airflow is 30° C. or higher and the resistance value of the second negative-temperature-coefficient thermistor element 32 is lower than 8.3 kΩ and when the voltage at the above-described node is lower than about 1.3 V, the second comparator element Cmp2 is turned ON so as to short-circuit the node between the first and second divided resistor elements $R3_A$ and $R3_B$ and connect the node to a ground.

Strictly speaking, the voltage at the node between the resistor elements R2 and R3 (first divided resistor element $R3_A$) of the comparison voltage divider circuit varies between when the second comparator element Cmp2 is ON and the second divided resistor element $R3_B$ is inserted in the comparison voltage divider circuit and when the second comparator element Cmp2 is OFF and the second divided resistor element $R3_B$ is not inserted in the comparison voltage divider circuit. However, the resistance value of the second divided resistor element $R3_B$ is as small as 390Ω, and the above-described variation can safely be ignored as the allowance.

In the airflow velocity measuring apparatus 300, as well as in the airflow velocity measuring apparatuses 100 and 200, measurement errors in the airflow velocity caused by a change in the airflow temperature can suitably be corrected over a wide temperature range.

The airflow velocity measuring apparatuses 100, 200, and 300 of the first through third embodiments have been discussed above. However, the present invention is not restricted to the above-described content, and various modifications may be made without departing from the scope and spirit of the invention.

For example, in the airflow velocity measuring apparatuses 100, 200, and 300, the resistor element R3 is divided into two resistor elements, that is, the first and second divided resistor elements $R3_A$ and $R3_B$. However, the resistor element R3 may be divided into three or more elements, and the divided resistor elements may selectively be used by using a switch.

In the airflow velocity measuring apparatuses 100, 200, and 300, the preset temperature of the fixed-temperature heat generating device 10 is about 35° C. However, as the preset temperature of the fixed-temperature heat generating device 10, any desirable temperature may be set and be changed.

In the airflow velocity measuring apparatuses 100, 200, and 300, to correct measurement errors in the airflow velocity caused by a change in the airflow temperature, the low temperature mode and the high temperature mode are selectively used in accordance with whether the airflow temperature is lower than 30° C. or higher than or equal to 30° C. However, any desirable temperature may be set for switching between the low temperature mode and the high temperature mode.

The resistance values of the resistor elements R1, R2, and R3 and the first and second divided resistor elements $R3_A$ and $R3_B$ and the resistance-temperature characteristics of the first and second negative-temperature-coefficient thermistor elements 21 and 32 may also be desirably set.

An airflow rate measuring apparatus may be formed by using any of the airflow velocity measuring apparatuses 100, 200, and 300.

REFERENCE SIGNS LIST 10 fixed-temperature heat generating device
20 heating unit
30 temperature controller
21 first negative-temperature-coefficient thermistor element
22 positive-temperature-coefficient thermistor element (heating element)
32 second negative-temperature-coefficient thermistor element
SW1 (first) switch
SW2 second switch
Q1 (first) switching element
Q2 second switching element
Cmp1 (first) comparator element
Cmp2 second comparator element
40 pulse voltage monitor
50 microcomputer
100, 200, 300 airflow velocity measuring apparatus

The invention claimed is:

1. An airflow velocity measuring apparatus comprising:
a fixed-temperature heat generating device that generates heat at a preset temperature, the fixed-temperature heat generating device including:
a power supply;
a heating element that generates heat when receiving power from the power supply, the heating element disposed at a measuring point at which a velocity of airflow is to be measured;
a switching element between the power supply and the heating element;
a first negative-temperature-coefficient thermistor element thermally coupled with the heating element, wherein a resistance value of the first negative-temperature-coefficient thermistor element at the preset temperature is a threshold resistance value;
a first resistor element connected in series with the first negative-temperature-coefficient thermistor element so as to form a temperature-detecting voltage divider circuit, wherein a temperature-detecting voltage is output from a node between the first negative-temperature-coefficient thermistor element and the first resistor element of the temperature-detecting voltage divider circuit;
a second resistor element, a first divided resistor element, a second divided resistor element, and a second negative-temperature-coefficient thermistor element connected in series with each other so as to form a comparison voltage divider circuit, wherein a comparison voltage is output from a node between the second resistor element and the first divided resistor element of the comparison voltage divider circuit;
a comparator element that compares the temperature-detecting voltage and the comparison voltage with each other and turns ON or OFF the switching element in accordance with a comparison result, wherein, as a result of the switching element being repeatedly turned ON and OFF, a pulse voltage is applied from the power supply to the heating element; and a switch that switches between a first state in which both the first and second divided resistor elements are connected to the comparison voltage divider circuit and a second state in which only one of the first and second divided resistor elements is connected to the comparison voltage divider circuit in accordance with the velocity of airflow at the measuring point based on a waveform of the applied pulse voltage.

2. The airflow velocity measuring apparatus according to claim 1, wherein:

a resistance value of the first resistor element of the temperature-detecting voltage divider circuit, resistance values of at least two of the second resistor element, the first divided resistor element, the second divided resistor element of the comparison voltage divider circuit, and a fixed voltage applied to each of the temperature-detecting voltage divider circuit and the comparison voltage divider circuit are set so that a temperature-detecting voltage and a comparison voltage become equal to each other when the temperature of the first negative-temperature-coefficient thermistor element is the preset temperature and when the resistance value of the first negative-temperature-coefficient thermistor element is the threshold resistance value, when the temperature of the first negative-temperature-coefficient thermistor element is lower than the preset temperature and when the resistance value of the first negative-temperature-coefficient thermistor element is greater than the threshold resistance value, the temperature-detecting voltage is greater than the comparison voltage, and when the temperature of the first negative-temperature-coefficient thermistor element is higher than the preset temperature and when the resistance value of the first negative-temperature-coefficient thermistor element is smaller than the threshold resistance value, the temperature-detecting voltage is smaller than the comparison voltage, or when the temperature of the first negative-temperature-coefficient thermistor element is lower than the preset temperature and when the resistance value of the first negative-temperature-coefficient thermistor element is greater than the threshold resistance value, the temperature-detecting voltage is smaller than the comparison voltage, and when the temperature of the first negative-temperature-coefficient thermistor element is higher than the preset temperature and when the resistance value of the first negative-temperature-coefficient thermistor element is smaller than the threshold resistance value, the temperature-detecting voltage is greater than the comparison voltage, the comparator element compares the temperature-detecting voltage and the comparison voltage with each other, and when the temperature of the first negative-temperature-coefficient thermistor element is lower than the preset temperature and when the resistance value of the first negative-temperature-coefficient thermistor element is greater than the threshold resistance value, the comparator element turns ON the switching element, and when the temperature of the first negative-temperature-coefficient thermistor element is higher than the preset temperature and when the resistance value of the first negative-temperature-coefficient thermistor element is smaller than the threshold resistance value, the comparator element turns OFF the switching element, and the switch switches between the first and second states in response to the temperature of airflow passing through the measuring point.

3. The airflow velocity measuring apparatus according to claim 2, further comprising a microcomputer configured to receive an indication of the temperature of the airflow passing through the measuring point, and control the switch to switch between the first and second states.

4. The airflow velocity measuring apparatus according to claim 2, wherein the switch is configured so as to switch between the first and second states in response to a resistance value of the second negative-temperature-coefficient thermistor element, the resistance value being changed by the temperature of the airflow passing through the measuring point.

5. The airflow velocity measuring apparatus according to claim 1, further comprising a microcomputer configured to receive an indication of the temperature of the airflow passing through the measuring point, and control the switch to switch between the first and second states.

6. The airflow velocity measuring apparatus according to claim 1, wherein the switch is configured so as to switch between the first and second states in response to a resistance value of the second negative-temperature-coefficient thermistor element, the resistance value being changed by the temperature of the airflow passing through the measuring point.

7. The airflow velocity measuring apparatus according to claim 1, wherein the switch is connected between a ground and a node between the first and second divided resistor elements.

8. The airflow velocity measuring apparatus according to claim 1, wherein the switch is a second switching element.

9. The airflow velocity measuring apparatus according to claim 8, wherein the second switching element is disposed between a ground and a node between the first and second divided resistor elements.

10. The airflow velocity measuring apparatus according to claim 8, wherein the second switching element is an NPN transistor.

11. The airflow velocity measuring apparatus according to claim 1, wherein the comparator element is a first comparator element, and the switch is a second comparator element.

12. The airflow velocity measuring apparatus according to claim 11, wherein the second comparator element is disposed between a ground and a node between the first and second divided resistor elements.

13. An airflow rate measuring apparatus comprising the airflow velocity measuring apparatus according to claim 1.

* * * * *